(No Model.)
L. S. M. PYKE & H. T. BARNETT.
DYNAMO ELECTRIC MACHINE.
No. 472,628. Patented Apr. 12, 1892.
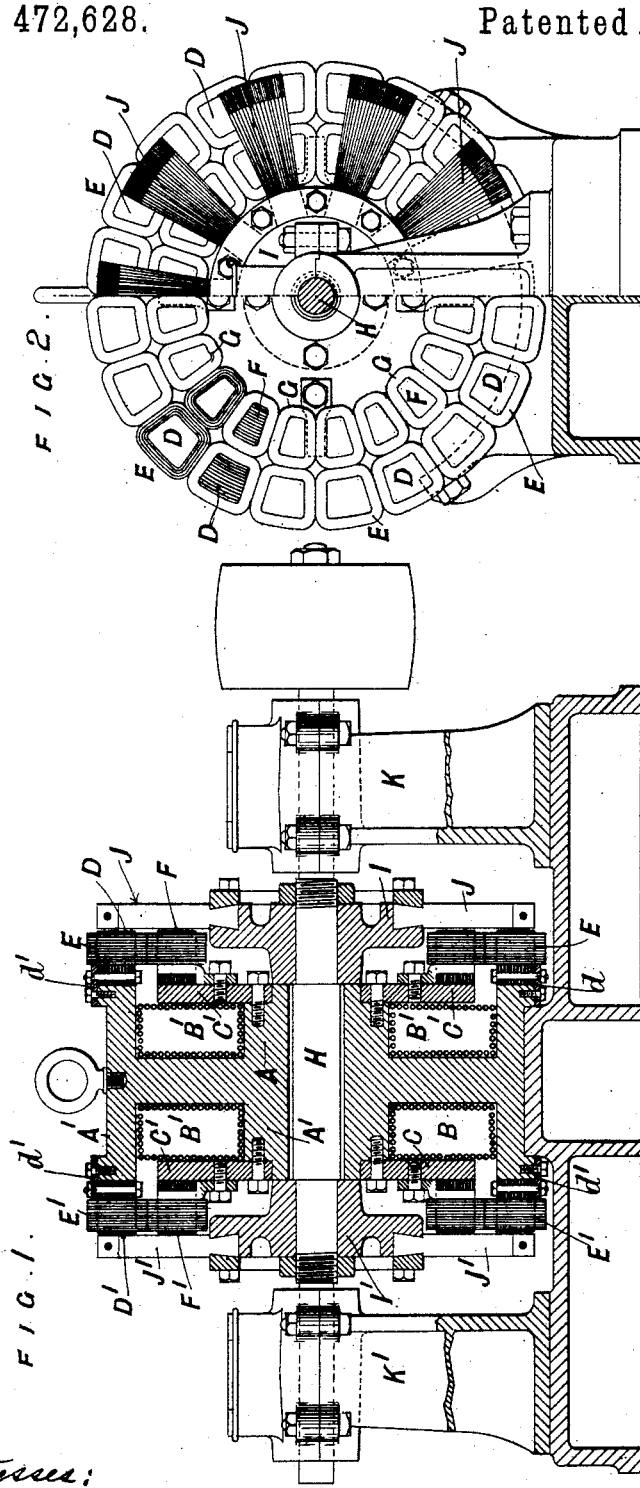
Witnesses:
L. M. Wachschlager
H. E. Everding.
Inventors
Lazarus S. M. Pyke
Harry T. Barnett
by Briesen & Knauth
their Attorneys.

UNITED STATES PATENT OFFICE.

LAZARUS SIMON MAGNUS PYKE AND HARRY THEODORE BARNETT, OF LONDON, ENGLAND, ASSIGNORS TO SAID PYKE AND EDWARD STEPHEN HARRIS, OF SAME PLACE.

DYNAMO-ELECTRIC MACHINE.

SPECIFICATION forming part of Letters Patent No. 472,628, dated April 12, 1892.

Application filed February 5, 1892. Serial No. 420,442. (No model.) Patented in England August 9, 1888, No. 11,503.

*To all whom it may concern:*

Be it known that we, LAZARUS SIMON MAGNUS PYKE, electrical engineer, residing at 34 New Tothill Street, Westminster, England, and HARRY THEODORE BARNETT, electrical engineer, residing at 16 Hotham Road, London, England, subjects of the Queen of Great Britain, have invented certain new and useful Improvements in Dynamo-Electric Machines, (for which we have received Letters Patent in Great Britain, No. 11,503, dated August 9, 1888,) of which the following is a specification.

This invention relates to dynamo-electric generators wherein both the field or inducing and the secondary or induced coils and their cores are stationary and the current is generated in the secondary coils by the commutation of the magnetic circuit through their cores by the revolution of magnetizable segments, termed "inductors," in close proximity to the said cores. The cores of the secondary coils constitute polar projections of the field-magnet poles. They are arranged in concentric circles in the same plane, those of the two circles being on the same radii, and the segments or inductors by which the commutation of the lines of magnetic force is effected are so arranged and proportioned that the aggregate magnetic effect will be approximately constant during their revolution.

Reference is to be had to the accompanying drawings, forming part of this specification, wherein—

Figure 1 is a central longitudinal section, and Fig. 2 an end elevation, partly in section, of a double form of dynamo—*i. e.*, having two sets of field-coils, secondary coils, and inductors, the one set being a duplicate of the other and the invention being equally applicable to a single form of dynamo.

The same letters of reference indicate the same parts in both figures, and it will be sufficient to describe one half of the dynamo shown in Fig. 1, the other half being identical thereto and similarly lettered with the addition of a dash.

A is the magnetizable mass of the field-magnet, inclosing on three sides an annular space containing the field-coil B, which is almost entirely inclosed by an iron disk C, bolted to the hub of the mass and leaving only a narrow annular space or zone between its periphery and the outer circumferential portion of the mass, so that the coil is surrounded by iron on all sides, except at this narrow zone. To the end of the circumferential portion of the mass A are secured by bolts and clamps $d$ one set of laminated polar projections formed of concentric bands having projections D, like crown-teeth, which together constitute the cores of the one circle of secondary coils E. To the disk C are similarly secured a corresponding set of similarly-constructed polar projections F, which form the cores of the other circle of secondary coils G, these two circles of cores D and F being of opposite polarity. The coils E and G are connected in radial pairs, and the pairs are connected in parallel or grouped in series, according to requirements. In Fig. 2 the coils are merely indicated in outline, (except at one pair of poles,) and the lamination of the pole-pieces is represented at one pair of poles only. The revolving inductors J are sector-shaped, and each is formed of radial strips or laminæ of soft iron, separated at the outer ends by packing pieces of paper and bolted together, as shown. Their roots are dovetailed and secured by a clamping-ring and bolts to a hub I of phosphor-bronze, keyed on the shaft H, mounted in a bearing in the hub of the mass A. There are half as many inductors J as there are pairs of pole-pieces D F, and each is equal in breadth to the "pitch" of the pole-pieces, so that each is equal to the breadth of a pole-piece and the adjacent space between such pole-piece and the next, the object being to render the magnetizing effect of an inductor on one pair of poles equal to the demagnetizing effect on the adjoining pair of poles, so as to make the aggregate magnetic effect approximately constant—that is to say, during the revolution of the inductors alternate pairs of poles D F are simultaneously magnetized while the intervening pairs of poles are being simultaneously demagnetized, and vice versa—the magnetic circuit of the mass A being completed inductively by the inductors alternately through the one or other of these alternate sets of pairs, the commutation being gradual, according to the change of position of the inductors with regard thereto during their revolution. The coil B is supplied with current from an exciting-dynamo or other convenient source, and in the duplex form of machine shown the two coils B B' are oppositely wound if connected and acting together as one.

What we claim is—

In a dynamo-electric generator, the combination of an annular stationary electro-magnet having its coil inclosed by the magnetizable mass, as described, two concentric circles of laminated polar projections arranged in radial pairs in the same plane and serving as cores for the secondary coils, and sector-shaped laminated magnetic inductors revolving in front of and in proximity to the polar projections, so as to commute the lines of force, the inductors corresponding in breadth to the pitch of the polar projections, as and for the purpose specified.

Dated this 12th day of January, 1892.

LAZARUS SIMON MAGNUS PYKE.
HARRY THEODORE BARNETT.

Witnessses:
G. F. WARREN,
 *Notary Public, London.*
JOSEPH LAKE,
 17 *Gracechurch Street, London, E. C.*